(12) United States Patent
Trube et al.

(10) Patent No.: US 7,211,765 B2
(45) Date of Patent: May 1, 2007

(54) SHIELDING GAS AND ARC-WELDING METHOD

(75) Inventors: Stefan Trube, Herborn-Guntersdorf (DE); Thomas Ammann, München (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 11/154,597

(22) Filed: Jun. 17, 2005

(65) Prior Publication Data

US 2005/0230357 A1    Oct. 20, 2005

Related U.S. Application Data

(60) Division of application No. 10/461,873, filed on Jun. 16, 2003, now abandoned, and a continuation-in-part of application No. PCT/EP01/14801, filed on Dec. 14, 2001.

(30) Foreign Application Priority Data

Dec. 15, 2000  (DE) ................................ 100 62 564

(51) Int. Cl.
   *B23K 9/16*   (2006.01)
   *B23K 9/167*  (2006.01)
   *B23K 9/173*  (2006.01)

(52) U.S. Cl. .................... 219/137 R; 219/74; 219/75; 252/372

(58) Field of Classification Search ............... 252/372, 252/373; 228/219; 219/129, 136, 137 R, 219/74, 75
See application file for complete search history.

(56) References Cited

U.S. PATENT DOCUMENTS

| 2,939,942 | A | * | 6/1960 | Scheil ........................ 219/74 |
| 3,620,700 | A | * | 11/1971 | Schlinger et al. ............. 48/215 |
| 3,925,490 | A | * | 12/1975 | Reich et al. ................. 568/914 |
| 4,119,566 | A | * | 10/1978 | Crouch et al. ............... 252/372 |
| 4,256,604 | A | * | 3/1981 | Aida et al. .................. 252/372 |
| 4,988,368 | A | * | 1/1991 | Crenwelge et al. ........... 48/210 |
| 5,558,791 | A | * | 9/1996 | Fawer ................. 219/137 WM |
| 5,667,728 | A | * | 9/1997 | Lee ............................... 585/6 |
| 6,069,336 | A | * | 5/2000 | Borne et al. .................. 219/75 |
| 6,111,219 | A |   | 8/2000 | Macedo et al. |
| 6,153,163 | A | * | 11/2000 | Prasad et al. ................ 423/246 |
| 6,198,068 | B1 | * | 3/2001 | Lindstrom ............. 219/121.46 |
| 6,315,965 | B1 | * | 11/2001 | Horn Feja et al. .......... 422/232 |
| 6,570,127 | B2 | * | 5/2003 | Correia et al. .............. 219/129 |
| 6,624,387 | B1 | * | 9/2003 | Tischler ...................... 219/129 |
| 6,735,980 | B2 | * | 5/2004 | Cook et al. .................... 62/640 |
| 2002/0008094 | A1 | * | 1/2002 | Briand et al. ........... 219/137 R |
| 2003/0173343 | A1 | * | 9/2003 | Matile et al. .......... 219/121.64 |
| 2005/0011868 | A1 | * | 1/2005 | Matile et al. .......... 219/121.64 |

FOREIGN PATENT DOCUMENTS

| DE | 133538 | 1/1979 |
| DE | 680802 | 11/1995 |
| DE | 949041 | 10/1999 |
| FR | 1463485 | * 12/1966 |

OTHER PUBLICATIONS

German Search Report.

\* cited by examiner

*Primary Examiner*—Wayne A. Langel
(74) *Attorney, Agent, or Firm*—Crowell & Moring LLP

(57) ABSTRACT

The invention relates to a shielding gas for use in the arc welding of metallic work pieces. The invention further relates to a process for the arc welding of metallic work pieces using consumable electrodes, whereby a shielding gas stream is supplied to the work piece adjacent to the electrode. According to the invention, for shielding gases recommended for use in the MSG welding, preferably the MAG welding, of rust-proof steels, especially nickel-based materials, specialty steels, or high-alloy steels,
   a) if the shielding gas contains no helium, it contains carbon dioxide in a proportion of between 0.001% by volume and 1.9% by volume and
   b) if the shielding gas does contain helium, it contains carbon dioxide in a proportion of between 0.001% by volume and 0.9% by volume,
in addition to argon, nitrogen, and, if applicable, helium.

19 Claims, No Drawings

SHIELDING GAS AND ARC-WELDING METHOD

CROSS REFERENCE TO RELATED APPLICATIONS

This application is a divisional of application Ser. No. 10/461,873 filed on Jun. 16, 2003, abandoned, and is a continuation of International Patent Application No. PCT/EP01/14801, filed Dec. 14, 2001, designating the United States of America, and published in German as WO 02/47859, the entire disclosure of which is incorporated herein by reference. Priority is claimed based on Federal Republic of Germany patent application no. DE 100 62 564.9, filed Dec. 15, 2000.

BACKGROUND AND SUMMARY OF INVENTION

The invention relates to a shielding gas for use in the arc welding of metallic work pieces. The invention further relates to a process for arc welding metallic work pieces using consumable electrodes, whereby a stream of shielding gas is supplied to the work piece, adjacent to the electrode.

In industrial applications, numerous shielding gases for use in the welding of metals under a shielding gas are known, wherein different shielding gases may be used, depending upon the composition or the material of the work piece to be welded, and/or upon the nature of the welding process.

Gas shielded welding (SG welding) can be broken down, based upon the type of electrodes used, into gas-shielded metal arc welding (MSG welding), which uses consumable electrodes, and welding processes that use non-consumable electrodes, such as tungsten inert-gas welding (TIG welding). As variations of MSG welding, active-gas metal arc welding (MAG welding) and inert-gas metal arc welding (MIG welding) are known and frequently used.

For example, Linde Gas AG markets two shielding gases for welding under the names CRONIGON® He 50 S or CRONIGON® He 30 S. These gas mixtures contain 0.05% by volume $CO_2$, 50% by volume helium, with the remainder argon, or 0.05% by volume $CO_2$, 30% by volume helium, 2% by volume $H_2$, and the remainder argon (comp. for example Linde brochure "Shielding Gases for Welding").

Up to now, certain high-temperature nickel-based alloys and specialty steels, such as alloy 602CA (material No. 2.4633) have not been satisfactorily weldable using MIG/MAG processes. The use of known shielding gases produces inadequate results and above all unacceptable mechanical-technological properties in the weld seams.

In another group of nickel-based materials, namely highly corrosion-resistant alloys such as alloy 59 (material No. 2.4605), corrosion resistance in the welding seam can be achieved using MIG/MAG welding, however, the level of resistance in the base material is not entirely achieved.

The object of the present invention is to provide a shielding gas and a process of the type described at the beginning whereby improvements on or alternatives to known shielding gases for welding are disclosed. The object of the invention is further to propose shielding gases for welding with which rust-proof metallic materials, especially the above-mentioned high-temperature nickel-based alloys, but also high-alloy steels, can be welded using an MSG or MAG process. A further object of the invention is to achieve the high level of corrosion resistance of the base material in the weld seam, especially with corrosion-resistant alloys.

These objects are attained according to the invention in that
  a) if the shielding gas contains no helium, it contains carbon dioxide in a proportion of between 0.001% by volume and 1.9% by volume, and
  b) if the shielding gas does contain helium, it contains carbon dioxide in a proportion of between 0.001% by volume and 0.9% by volume, in addition to argon and nitrogen.

Advantageous embodiments, developments, and improvements of the invention, especially compositions of preferably suitable gases, are the objects of the sub-claims.

Advantageously,
  a) if the shielding gas contains no helium, it can contain carbon dioxide in a proportion of between 0.01% by volume and 1.5% by volume and
  b) if the shielding gas does contain helium, it can contain carbon dioxide in a proportion of between 0.01% by volume and 0.8% by volume, in addition to argon and nitrogen.

In particular, the helium-free shielding gas can contain 0.001 and 0.9% by volume carbon dioxide, preferably between 0.01 and 0.8% by volume carbon dioxide, in addition to argon and nitrogen. With a helium-free shielding gas it is understood that the shielding gas contains no helium with the exception of possible contaminations or impurities.

Advantageously, the shielding gas contains between 0.01 and 0.5% by volume carbon dioxide, preferably between 0.01 and 0.45% by volume carbon dioxide, most preferably between 0.01 and 0.1% by volume carbon dioxide.

It has proven favorable for the shielding gas to contain between 0.1 and 20% by volume nitrogen, preferably between 0.5 and 15% by volume nitrogen, particularly preferably between 1 and 10% by volume, and most preferably between 2.5 and 7.5% by volume nitrogen.

In the further development of the invention, the shielding gas contains 70% by volume or less helium. In particular it is preferable for the shielding gas to contain between 1 and 50% by volume helium, preferably between 2 and 30% by volume helium, particularly preferably between 3 and 20% by volume helium, and most preferably between 5 and 10% by volume helium.

With advantage, the shielding gas can be comprised
  of a ternary gas mixture of the components argon, nitrogen and carbon dioxide, or
  of a quaternary gas mixture of the components argon, nitrogen, carbon dioxide and helium.

In this, particularly the proportions of nitrogen, carbon dioxide, and if applicable helium are made to correspond to the above-mentioned standards and intervals. Argon preferably makes up the remaining portion.

The stated objects are attained according to the invention with respect to the process, preferably an MSG process, particularly MAG welding, in that a shielding gas as described above is used.

According to the invention, the use of a shielding gas mixture having a composition that fulfills the standards listed above for use in the MSG welding, in particular the MAG welding, of rust-proof steels, especially nickel-based materials, specialty steels, or high-alloy steels, is recommended.

Ternary or quaternary gas mixtures that contain
  500 vpm $CO_2$,
  5% by volume $N_2$,
  if applicable, 5 to 10% by volume He and
  the remainder argon, represent exceptionally well suited shielding gases for welding as specified in the invention.

With the shielding gases specified in the invention, high-temperature nickel-based alloys, such as alloy 602CA (material No. 2.4633) can be MAG welded. In this, the mechanical-technological properties of the weld seam are nearly completely retained, as compared with the base material.

The use of this gas mixture is advantageous even with highly corrosion-resistant nickel-based materials, such as alloy 59 (material No. 2.4605) for example, in which the gas mixture specified in the invention in practical terms matches the corrosion-resistance of the seam with that of the base material.

The shielding gas specified in the invention contains argon, and if applicable helium, in addition to carbon dioxide and nitrogen. In this, the portion of $CO_2$ presumably promotes arc stabilization and the prevention of fusion problems. The share of nitrogen presumably exerts a metallurgical influence. Also probable is a desirable effect on the absorption of nitrogen in the welding material by the $CO_2$.

What is claimed is:

1. A method for arc welding of metallic work pieces using consumable electrodes, consisting of the step of:
supplying a shielding gas stream to a work piece adjacent to an electrode, wherein the shielding gas includes argon, between 1% and 20% by volume of nitrogen, between 0.001% and 0.9% by volume of carbon dioxide, and substantially no helium or oxygen; or argon, between 1% and 20% by volume of nitrogen, helium, between 0.001% and 0.5% by volume of carbon dioxide, and substantially no oxygen.

2. The method of claim 1, wherein the method of arc welding is MSG welding.

3. The method of claim 1, wherein the method of arc welding is MAG welding.

4. The method of claim 1, wherein the work piece is composed of a rust-proof steel.

5. The method of claim 4, wherein the work piece is composed of a material selected from the group consisting of nickel-based materials, specialty steels, and high-alloy steels.

6. The method of claim 1, wherein the shielding gas includes argon, nitrogen, between 0.01% and 0.5% by volume of carbon dioxide and substantially no helium; or the shielding gas comprises argon, nitrogen, helium, and between 0.0 1% and 0.45% by volume of carbon dioxide.

7. The method of claim 1, wherein the shielding gas includes argon, nitrogen, between 0.001% and 0.9% by volume of carbon dioxide, and substantially no helium.

8. The method of claim 7, wherein the shielding gas includes argon, nitrogen, between 0.01% and 0.8% by volume of carbon dioxide, and substantially no helium.

9. The method of claim 1, wherein the shielding gas includes between 0.01% and 0.5% by volume of carbon dioxide.

10. The method of claim 9, wherein the shielding gas includes between 0.01% and 0.45% by volume of carbon dioxide.

11. The method of claim 9, wherein the shielding gas comprises between about 0.01% and about 0.1% by volume of carbon dioxide.

12. The method of claim 1, wherein the shielding gas includes between 1% and 15% by volume of nitrogen.

13. The method of claim 1, wherein the shielding gas includes between 1% and 10% by volume of nitrogen.

14. The method of claim 1, wherein the shielding gas includes between 2.5% and 7.5% by volume of nitrogen.

15. The method of claim 1, wherein the shielding gas includes 70% or less by volume of helium.

16. The method of claim 1, wherein the shielding gas includes between 1% and 50% by volume of helium.

17. The method of claim 16, wherein the shielding gas includes between 2% and 30% by volume of helium.

18. The method of claim 16, wherein the shielding gas includes between 3% and 20% by volume of helium.

19. The method of claim 16, wherein the shielding gas includes between 5% and 10% by volume of helium.

* * * * *